(12) United States Patent
Han

(10) Patent No.: US 7,680,346 B2
(45) Date of Patent: Mar. 16, 2010

(54) METHOD AND APPARATUS FOR ENCODING IMAGE AND METHOD AND APPARATUS FOR DECODING IMAGE USING HUMAN VISUAL CHARACTERISTICS

(75) Inventor: Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 803 days.

(21) Appl. No.: 11/590,784

(22) Filed: Nov. 1, 2006

(65) Prior Publication Data

US 2007/0110327 A1 May 17, 2007

(30) Foreign Application Priority Data

Nov. 16, 2005 (KR) ........................ 10-2005-0109632

(51) Int. Cl.
*G06K 9/36* (2006.01)
(52) U.S. Cl. .................. 382/232; 382/236; 382/238; 382/239; 382/251
(58) Field of Classification Search .......... 382/232, 382/233, 236, 239, 240, 248, 251; 348/606, 348/607; 375/240.16, 240.29, E7.121, E7.256; 704/222, 219; 706/12, 46; 345/420, 426
See application file for complete search history.

(56) References Cited

U.S. PATENT DOCUMENTS 6,023,296 A 2/2000 Lee et al.
6,414,994 B1 * 7/2002 Hazra .................. 375/240.16

FOREIGN PATENT DOCUMENTS

| EP | 1 221 816 A2 | 12/2001 |
| KR | 2003-0029909 A | 4/2003 |
| KR | 10-2005-0038020 A | 4/2005 |
| WO | WO 2004/019273 A1 | 3/2004 |
| WO | WO 03/005726 A2 | 1/2006 |

* cited by examiner

*Primary Examiner*—Anh Hong Do
(74) *Attorney, Agent, or Firm*—Sughrue Mion, PLLC

(57) ABSTRACT

An image encoding method and apparatus capable of improving image compression efficiency by using human psychovisual characteristics are provided. In the image encoding method and apparatus, an image signal component of which amplitude is equal to or less than a just noticeable distortion (JND) that is a minimum limit of a visually noticeable image is not encoded according to image characteristics by using the masking effect of the human visual system (HVS), thereby improving an image compression rate without visible deterioration of image quality.

35 Claims, 14 Drawing Sheets

METHOD AND APPARATUS FOR ENCODING IMAGE AND METHOD AND APPARATUS FOR DECODING IMAGE USING HUMAN VISUAL CHARACTERISTICS

CROSS-REFERENCE TO RELATED PATENT APPLICATION

This application claims priority from Korean Patent Application No. 10-2005-0109632, filed on Nov. 16, 2005, in the Korean Intellectual Property Office, the disclosure of which is incorporated herein in its entirety by reference.

BACKGROUND OF THE INVENTION

1. Field of the Invention

Methods and apparatus consistent with the present invention relate to image encoding and decoding, and more particularly, to image encoding and decoding capable of improving image compression efficiency by using human psycho-visual characteristics.

2. Description of the Related Art

FIG. 1 illustrates an example of a related art prediction-based image encoding method.

Referring to FIG. 1, in video compression standards such as MPEG-1, MPEG-2, MPEG-4 Visual, H.261, H.263, and H.264, one frame is divided into a plurality of macro blocks, a prediction process is performed on a macro block basis to obtain a predicted block P corresponding to a current block O, a residual block, which is a difference between the current block O and the predicted block P, is transformed and quantized to reduce the range of a transform coefficient, and entropy coding is then performed.

In a conventional prediction-based image encoding method, a predicted block, i.e., the most similar block to a current block, is obtained by using spatio-temporal correlation of an image in an optimum manner. In the related art prediction-based image encoding method, compression efficiency is enhanced by coding a residual signal that is a difference between the current block and the predicted block. Eventually, in the related art image encoding method, the compression efficiency is determined based on the degree of similarity between the current block and the predicted block.

However, the related art method does not properly use the characteristics of the human visual system when an image is encoded. According to the related art method, a residual block or an entire transformed block is encoded as it is including a portion which cannot be easily visually noticed by a user. In order to overcome a limit in a transfer bandwidth and to provide a high definition image to the user, there is a need for an image encoding method having further improved compression efficiency.

SUMMARY OF THE INVENTION

The present invention provides an image encoding method and apparatus capable of improving image compression efficiency by applying a psycho-visual model using a masking effect of the human visual system to a prediction-based encoding method.

According to an aspect of the present invention, there is provided an image encoding method comprising: creating a predicted block corresponding to a current block to be encoded; creating a residual block by estimating a difference between the current block and the predicted block; creating a transformed residual block and a transformed predicted block by transforming the residual block and the predicted block, respectively; obtaining a minimum threshold transform coefficient which allows a corresponding pixel included in the transformed predicted block to be visually noticeable, and creating a minimum threshold block including the minimum threshold transform coefficient; and determining an optimum quantization step which allows a maximum quantization error to be equal to or less than the minimum threshold transform coefficient with respect to a corresponding coefficient of the transformed residual block, and quantizing the corresponding coefficient of the transformed residual block based on the determined optimum quantization step.

According to another aspect of the present invention, there is provided an image encoding method comprising: creating a predicted block corresponding to a current block to be encoded; creating a residual block by estimating a difference between the current block and the predicted block; creating a transformed residual block and a transformed predicted block by transforming the residual block and the predicted block, respectively; obtaining a minimum threshold transform coefficient which allows a corresponding pixel of the transformed predicted block to be visually noticeable, and creating a minimum threshold block including the minimum threshold transform coefficient; and selecting a coefficient of the transformed residual block to be encoded from coefficients of the transformed residual block by comparing the minimum threshold transform coefficient with a corresponding coefficient of the transformed residual block.

According to another aspect of the present invention, there is provided an image encoding method comprising: creating a predicted block corresponding to a current block to be encoded; creating a residual block by estimating a difference between the current block and the predicted block; obtaining a minimum threshold coefficient which allows a corresponding pixel included in the predicted block to be visually noticeable, and creating a minimum threshold block including the minimum threshold coefficient; and creating a difference residual block by estimating a difference between the minimum threshold coefficient and a corresponding coefficient of the residual block.

According to another aspect of the present invention, there is provided an image encoding apparatus comprising: a prediction unit which creates a predicted block corresponding to a current block to be encoded; a subtraction unit which creates a residual block by estimating a difference between the current block and the predicted block; a first transform unit which creates a transformed residual block by transforming the residual block; a second transform unit which creates a transformed predicted block by transforming the predicted block; a minimum threshold block creating unit which obtains a minimum threshold transform coefficient which allows a coefficient included in the transformed predicted block to be visually noticeable, and creates a minimum threshold block comprising the minimum threshold transform coefficient; and a quantization unit which determines an optimum quantization step which allows a maximum quantization error to be equal to or less than the minimum threshold transform coefficient with respect to a corresponding coefficient of the transformed residual block, and quantizes the corresponding coefficient of the transformed residual block based on the determined optimum quantization step.

According to another aspect of the present invention, there is provided an image encoding apparatus comprising: a prediction unit which creates a predicted block corresponding to a current block to be encoded; a subtraction unit which creates a residual block by estimating a difference between the current block and the predicted block; a first transform unit which creates a transformed residual block by transforming the residual block; a second transform unit which creates a transformed predicted block by transforming the predicted block; a minimum threshold block creating unit which obtains a minimum threshold transform coefficient which allows a coefficient included in the transformed predicted block to be visually noticeable, and creates a minimum threshold block comprising the minimum threshold transform coefficient; and a selecting unit which selects a coefficient of a transformed residual block to be encoded from coefficients of the transformed residual block by comparing the minimum threshold transform coefficient with a corresponding coefficient of the transformed residual block.

According to another aspect of the present invention, there is provided an image encoding apparatus comprising: a prediction unit which creates a predicted block corresponding to a current block to be encoded; a first subtraction unit which creates a residual block by estimating a difference between the current block and the predicted block; a minimum threshold block creating unit which obtains a minimum threshold coefficient which allows a corresponding pixel included in the predicted block to be visually noticeable, and creates a minimum threshold block comprising the minimum threshold coefficient; and a second subtraction unit which creates a difference residual block by estimating a difference between the minimum threshold coefficient and a corresponding coefficient of the residual block.

According to another aspect of the present invention, there is provided an image decoding method comprising: reading information on an optimum quantization step, which is determined such that a maximum quantization error is equal to or less than a minimum threshold transform coefficient with respect to each coefficient of a transformed residual block, and information on a coefficient of the transformed residual block, the coefficient being quantized according to the optimum quantization step, from a received bit-stream; inverse-quantizing the quantized coefficient of the transformed residual block; and restoring an image by adding a predicted block for a current block to be decoded and the inverse-transformed transformed residual block.

According to another aspect of the present invention, there is provided an image decoding apparatus comprising: an entropy decoder which reads information on an optimum quantization step, which is determined such that a maximum quantization error is equal to or less than a minimum threshold transform coefficient with respect to each coefficient of a transformed residual block, and information on a coefficient of the transformed residual block, the coefficient being quantized according to the optimum quantization step, from a received bit-stream; an inverse-quantization unit which inverse-quantizes the coefficients of the transformed residual block, which are quantized according to the read optimum quantization step; an inverse-transform unit which outputs a residual block by inverse-transforming the quantized coefficient of the transformed residual block; a prediction unit which creates a predicted block for a current block to be decoded; and an add unit which restores an image by adding the inverse-transformed residual block and the predicted block.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Hereinafter, the present invention will be described in detail by explaining exemplary embodiments of the invention with reference to the attached drawings.

The characteristics of the human visual system (HVS) will be first described. Similarly to the human auditory system, the HVS has a masking effect. The masking effect in this case means that, when an image signal has a component greater than a predetermined amplitude at a particular frequency, a signal of which amplitude is less than the predetermined amplitude and which exists at a frequency band around the particular frequency cannot be noticed by a user, or an image signal of which amplitude is less than the predetermined amplitude cannot be noticed according to the image characteristics.

Figure 1:
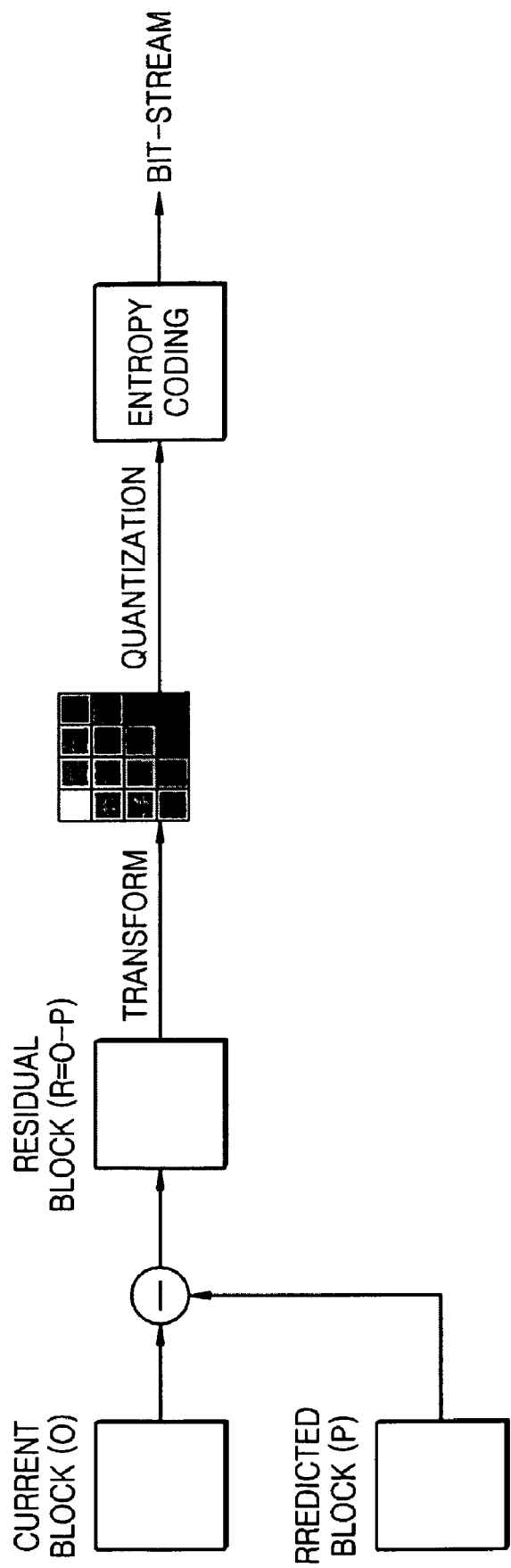
FIG. 1 illustrates an example of a related art prediction-based image encoding method.
Figure 2A:
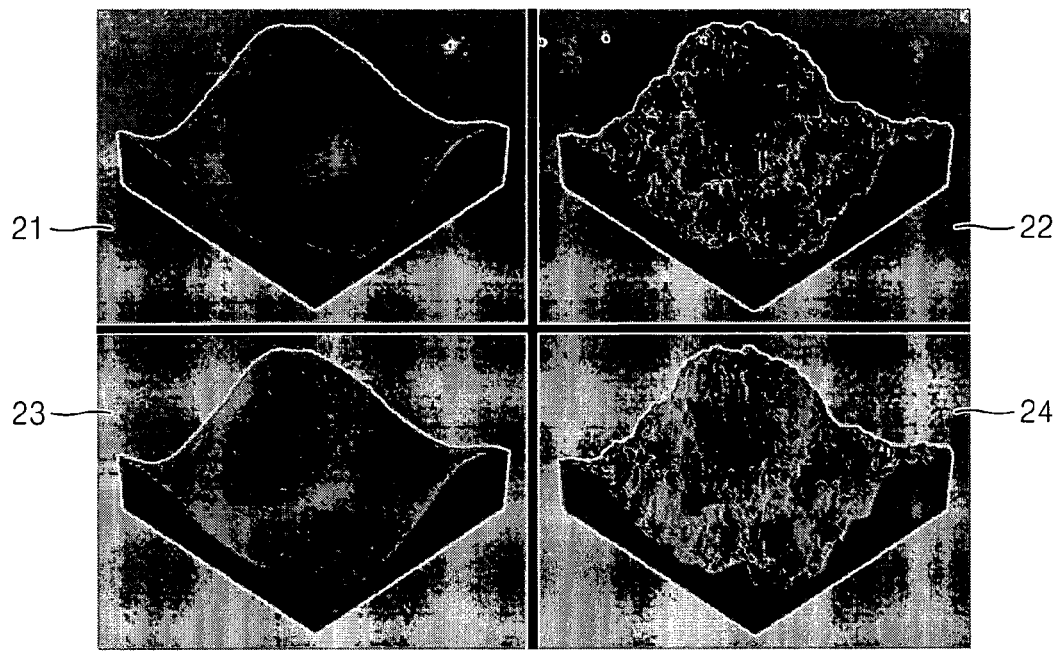
FIGS. 2A and 2B are views for explaining a masking effect of a human visual system (HVS) used according to an exemplary embodiment of the present invention.
Figure 2B:
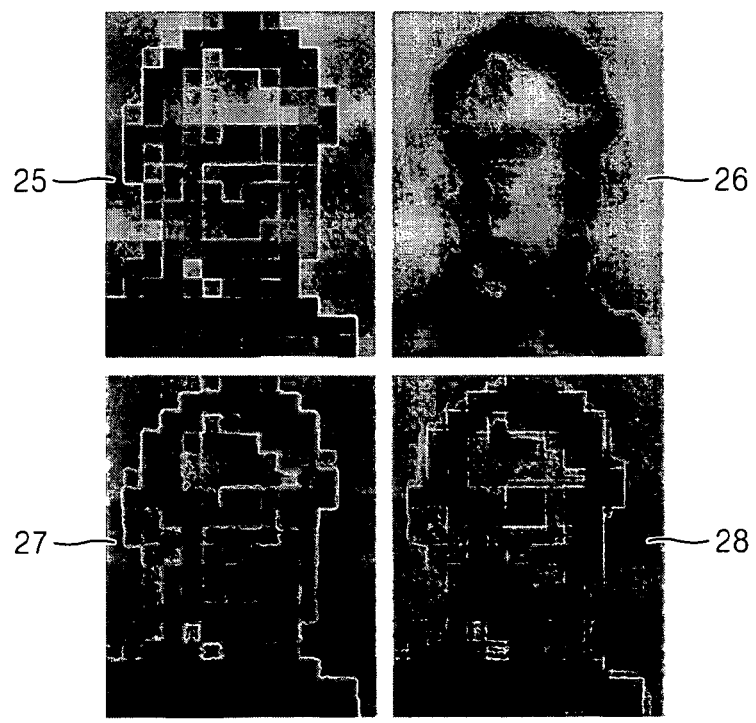

FIGS. 2A and 2B are views for explaining the masking effect of the HVS used in an exemplary embodiment of the present invention. Images 21 and 22 shown in the upper portion of FIG. 2A are quantized with eight-bit precision, and images 23 and 24 shown at the lower portion of FIG. 2A are quantized with four-bit precision.

When the images 22 and 24 of FIG. 2A having rough surfaces are compared with each other, a difference between an image quantized with eight-bit precision and an image quantized with four-bit precision is not easily visually noticeable. Meanwhile, when the images 21 and 23 having smooth surfaces are compared with each other, it can be seen that a banding effect is more apparent in the image quantized with four-bit precision than the image quantized with eight-bit precision. An encoded image may have an improved compression rate when a portion which is not visually noticeable by a user is not encoded, by controlling a quantization coefficient according to image characteristics.

In a first image 25 of FIG. 2B, an image of a person (i.e., Abraham Lincoln) with a continuous tone is sampled after low-pass filtered at 10 cycles/picture. In a second image 26 of FIG. 2B, the first image 25 is again low-pass filtered. In a third image 27, a high frequency band component equal to or greater than 40 cycles is removed from the first image 25. In a fourth image 28, a frequency band component in the range of 12-40 cycles is removed from the first image 25.

When the first image 25 and the second image 26 of FIG. 2B are compared with each other, visual recognition increases when discontinuous edge portions of blocks having a high frequency band component are removed through a low pass filter. However, not only the high frequency band component affects human visual recognition. Referring to the third image 27 and the fourth image 28 of FIG. 2B, visual recognition increases more in the fourth image 28 in which only a particular frequency band component in the range of 12-40 cycles is removed than the third image 27 in which a high frequency band component equal to or greater than 40 cycles is removed. The masking effect occurs when the limited frequency band components interact, and an image can be compressed with little difference in terms of visual recognition by removing only a particular frequency band component according to image characteristics.

According to an exemplary embodiment of the present invention, an image signal component of which amplitude is equal to or less than a just noticeable distortion (JND), which is a minimum limit of a visually noticeable image, is not encoded according to image characteristics by using the masking effect of the human visual system, thereby improving an image compression rate without subjective deterioration of image quality.

Figure 3:
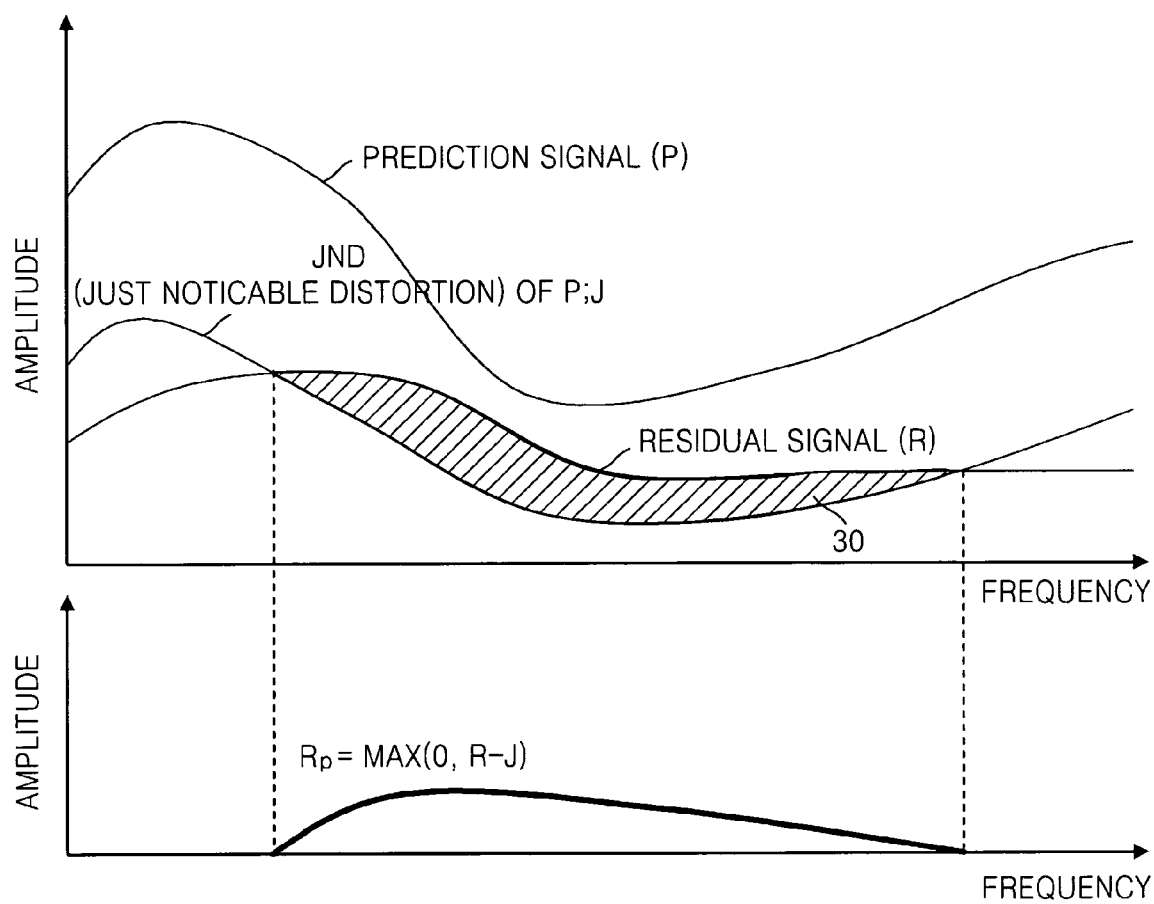
FIG. 3 is a view for explaining a concept of an image encoding method using human visual characteristics according to an exemplary embodiment of the present invention.

FIG. 3 is a view for explaining a concept of an image encoding method using human visual characteristics according to an exemplary embodiment of the present invention.

Assume that a prediction signal P is a signal predicted from an original image signal through intra-prediction or inter-prediction, a JND J is a minimum limit of a visually noticeable signal of the prediction signal P, and a residual signal R 32 is a difference between the original image signal O and the prediction signal P. Referring to FIG. 3, in the image encoding method of an exemplary embodiment of the present invention, the JND J, which is a minimum limit of a visually noticeable image, is estimated from the prediction signal P, and the residual signal R that is smaller than the JND J is not encoded, resulting in effective compression. In other words, only a difference MAX (O, R−J) between the JND J and a residual signal portion 30 greater than the JND J is encoded, thereby improving image compression efficiency.

To this end, in an image encoding method and apparatus of the the exemplary embodiment of present invention, data to be encoded is determined by taking the characteristics of the JND into account in a quantization operation, a transform operation, and a residual signal processing operation. Now, the image encoding method and apparatus of the exemplary embodiment of the present invention will be described by explaining exemplary embodiments of the invention with respect to each of the operations.

Figure 4:
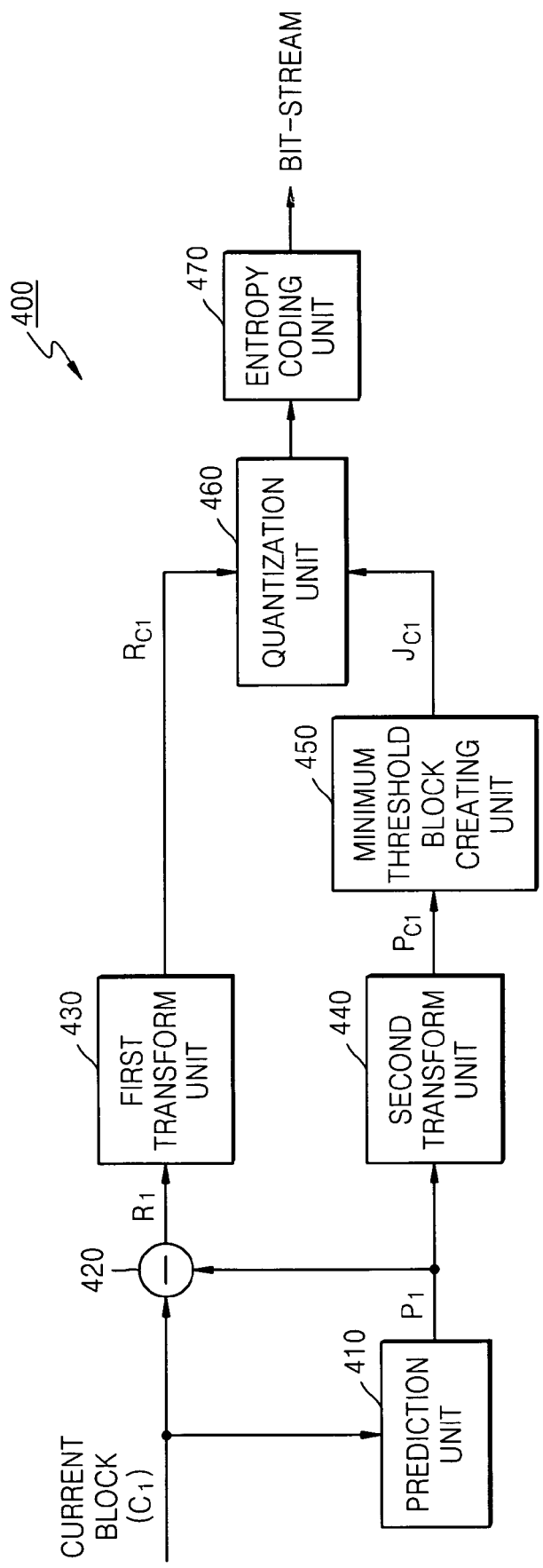
FIG. 4 is a block diagram of an image encoding apparatus according to an exemplary embodiment of the present invention.
Figure 5:
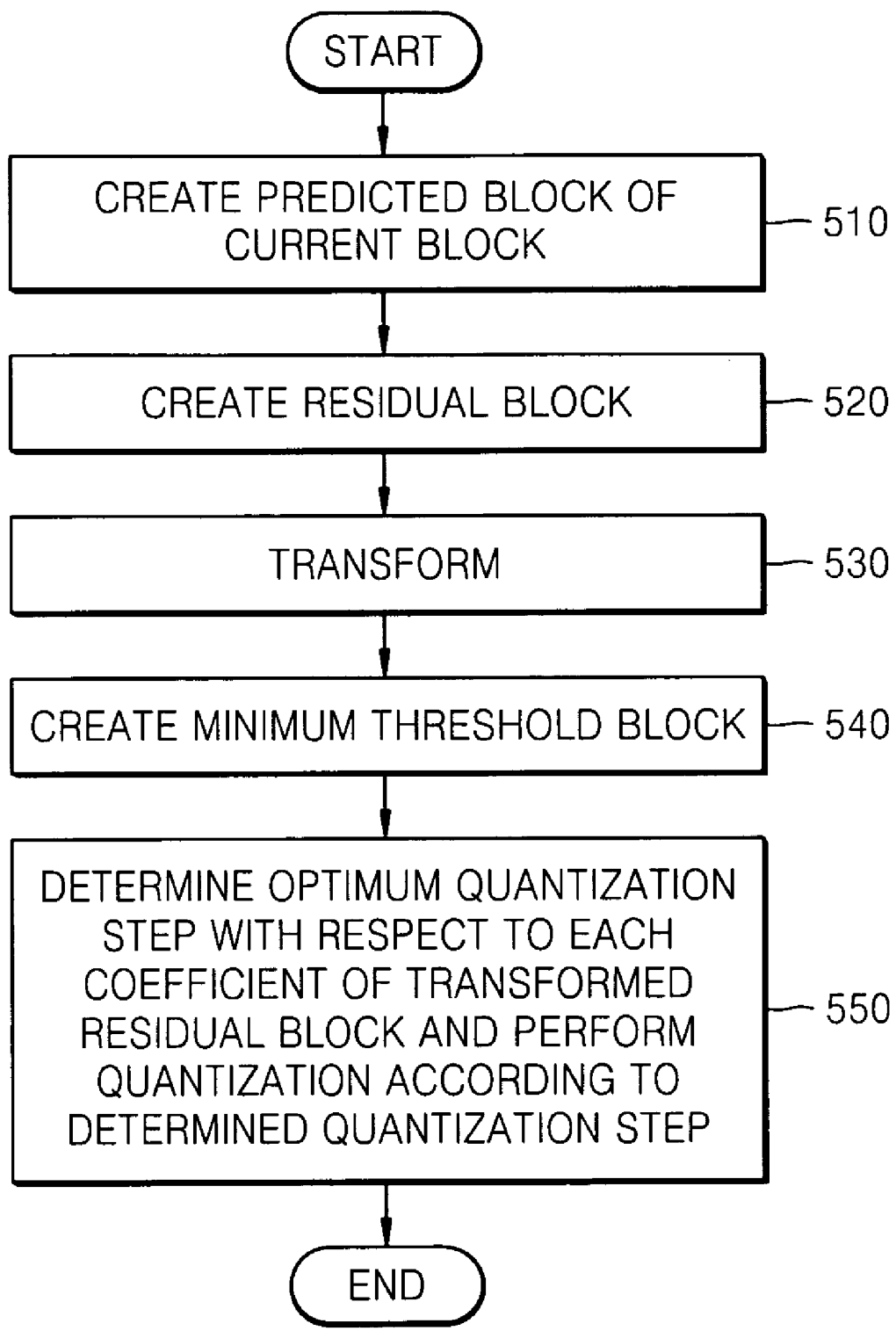
FIG. 5 is a flowchart of an image encoding method according to an exemplary embodiment of the present invention.
Figure 6:
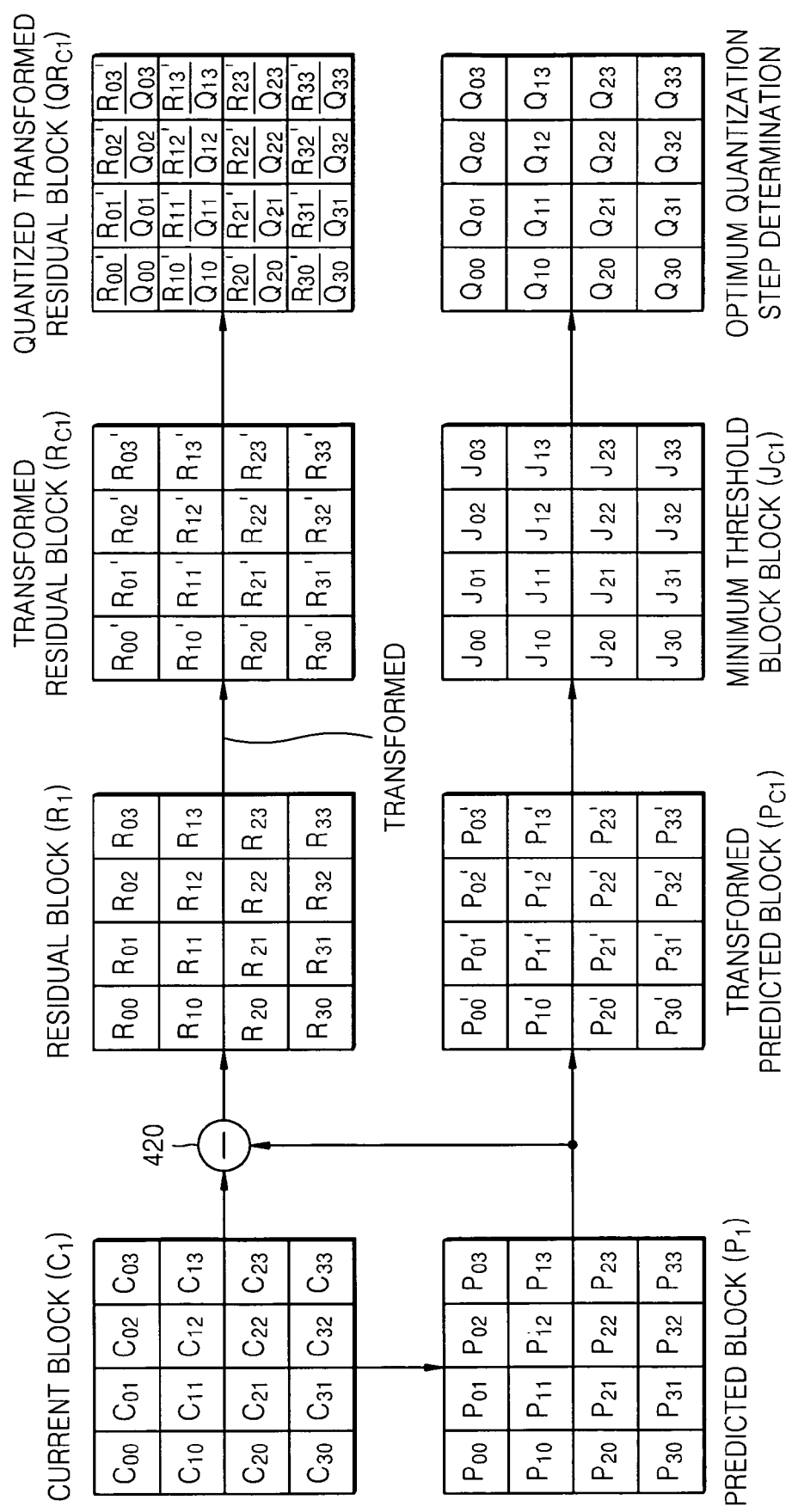
FIG. 6 illustrates blocks respectively created in operations of an image encoding method according to an exemplary embodiment of the present invention.

FIG. 4 is a block diagram of an image encoding apparatus according to an exemplary embodiment of the present invention. FIG. 5 is a flowchart of an image encoding method according to an exemplary embodiment of the present invention. FIG. 6 illustrates blocks respectively created in operations of an image encoding method according to an exemplary embodiment of the present invention. The image encoding method and apparatus of the present according to an exemplary embodiment of the present invention will now be described with reference to FIGS. 4 to 6.

In the method and apparatus according to an exemplary embodiment of the present invention, a quantization step is controlled to allow a quantization error generated in the quantization operation to be equal to or less than a specific visually noticeable threshold coefficient, that is, the JND.

Referring to FIG. 4, an image encoding apparatus 400 includes a prediction unit 410, a subtraction unit 420, a first transform unit 430, a second transform unit 440, a minimum threshold block creating unit 450, a quantization unit 460, and an entropy coding unit 470.

Referring to FIG. 5, in operation 510, the prediction unit 410 performs intra-prediction or inter-prediction with respect to a current block $C_1$ that is input on the basis of a specific sized block to be encoded, thereby creating a predicted block $P_1$ corresponding to the current block $C_1$.

In operation 520, the subtraction unit 420 subtracts the predicted block $P_1$ from the current block $C_1$, thereby creating a residual block $R_1$. Referring to FIG. 6, a pixel $R_{xy}$ located at the position (x, y) of the residual block $R_1$ has a value obtained by subtracting a pixel $P_{xy}$ of a corresponding predicted block from a pixel $C_{xy}$ included in the current block, which is $R_{xy} = C_{xy} - P_{xy}$.

In operation 530, the first transform unit 430 and the second transform unit 440 perform a frequency transform such as a discrete cosine transform (DCT) or a wavelet transform, thereby creating a transformed residual block $R_{c1}$ and a transformed predicted block $P_{c1}$ from the residual block $R_1$ and the predicted block $P_1$, respectively.

In operation 540, the minimum threshold block creating unit 450 obtains minimum threshold transform coefficients which allow each coefficient included in the transformed predicted block $P_{c1}$ to be visually noticeable, and creates a minimum threshold block $J_{c1}$ including the minimum threshold transform coefficients.

In operation 550, the quantization unit 460 determines an optimum quantization step used to quantize each residual transform coefficient R' of the transformed residual block $R_{c1}$. The optimum quantization step can be estimated using Formula 1.

[Formula 1]

$$Q_{step}^i = \arg\max\nolimits_{Q_{step}^i} \{|(R_i - J_i) - (R_i - J_i)^{Q_{step}^i}| \leq J_i\}$$

In Formula 1, $R_i$ is an i-th coefficient of a transformed residual block, $J_i$ is an i-th minimum threshold transform coefficient of a minimum threshold block, and $Q_{step}^i$ is an optimum quantization step used to quantize the i-th coefficient of the transformed residual block $R_{c1}$. In addition, $(R_i - J_i)^{Q_{step}^i}$ represents a quantized value of a difference between the transformed residual block $R_{c1}$ and the minimum threshold block $J_{c1}$ according to the optimum quantization step $Q_{step}^i$.

Referring to Formula 1, the quantization unit 460 may determine the optimum quantization step from a maximum value among quantization step values which allow an absolute value of a quantization error $(R_i - J_i) - (R_i - J_i)^{Q_{step}^i}$ to be equal to or less than a minimum threshold transform coefficient $J_i$ created from the predicted block $P_1$. However, when the quantization step is determined using Formula 1, the coefficients $R_i$ of the transformed residual block cannot be directly used in a decoding end. Therefore, the optimum quantization step may be determined using Formula 2.

[Formula 2]

$$Q_{step}^{i} = \arg\max_{Q_{step}^{i}}\{\text{MaxE}(Q_{step}^{i}) \leq J_i\}$$

In Formula 2, $\text{MaxE}(Q_{step}^{i})$ denotes a maximum quantization error value according to the optimum quantization step $Q_{step}^{i}$. For example, if a value of the optimal quantization step $Q_{step}^{i}$ is a, a maximum quantization error value generated by rounding-off or rounding-down becomes a/2. The quantization unit 460 determines the optimum quantization step from a maximum value among quantization step values which allow the maximum quantization error $\text{MaxE}(Q_{step}^{i})$ to be equal to or less than a minimum threshold transform coefficient $J_i$, then quantizes the transformed residual block $R_{c1}$ according to the determined optimum quantization step, and then creates a quantized transformed residual block $QR_{c1}$. When information on the optimum quantization step $Q_{step}^{i}$ is transferred while being included in an encoded bit-stream, an inverse-quantization can be carried out in the decoding end with respect to coefficients of the quantized transformed residual block by using information on the transferred optimum quantization step.

Meanwhile, when a significantly high compression rate is required due to a limit in a transfer bandwidth, that is, when an assignable bit is limited, and when encoding is performed using a quantization step obtained by Formula 2, a desired bit rate may not be achieved in some cases. In this case, for adaptable use, the optimum quantization step determined by the Formula 2 may be used only when the optimum quantization step is greater than a predetermined quantization step for the coefficients of the transformed residual block. In addition, an average value of the optimum quantization step may change while a relative rate of a quantization step determined by Formula 2 is maintained with respect to coefficients of each transformed residual block, for an adaptive bit assignment according to changes in a bandwidth.

In this manner, image compression efficiency can be improved by controlling a quantization step such that a quantization noise is equal to or less than the JND that is a minimum level noticeable by a human visual system.

Figure 7:
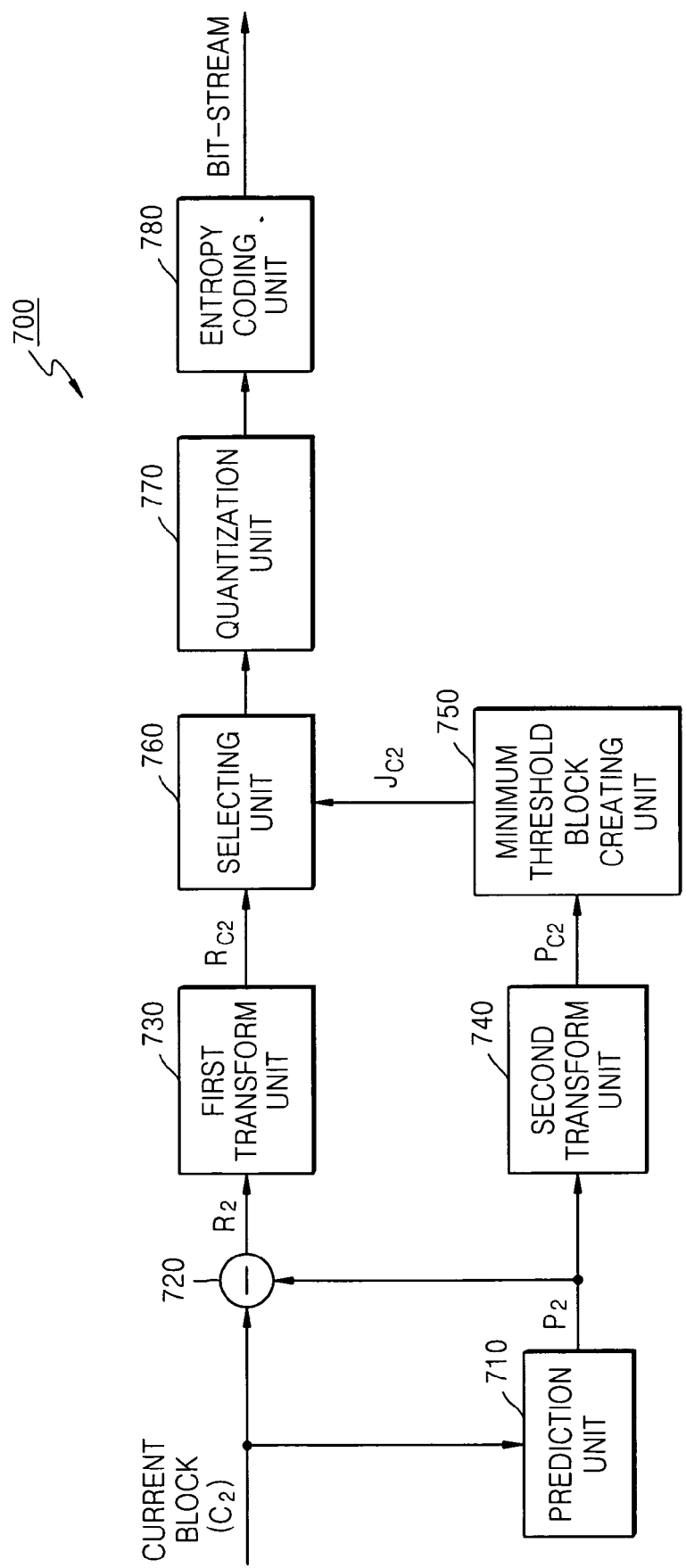
FIG. 7 is a block diagram of an image encoding apparatus according to another exemplary embodiment of the present invention.
Figure 8:
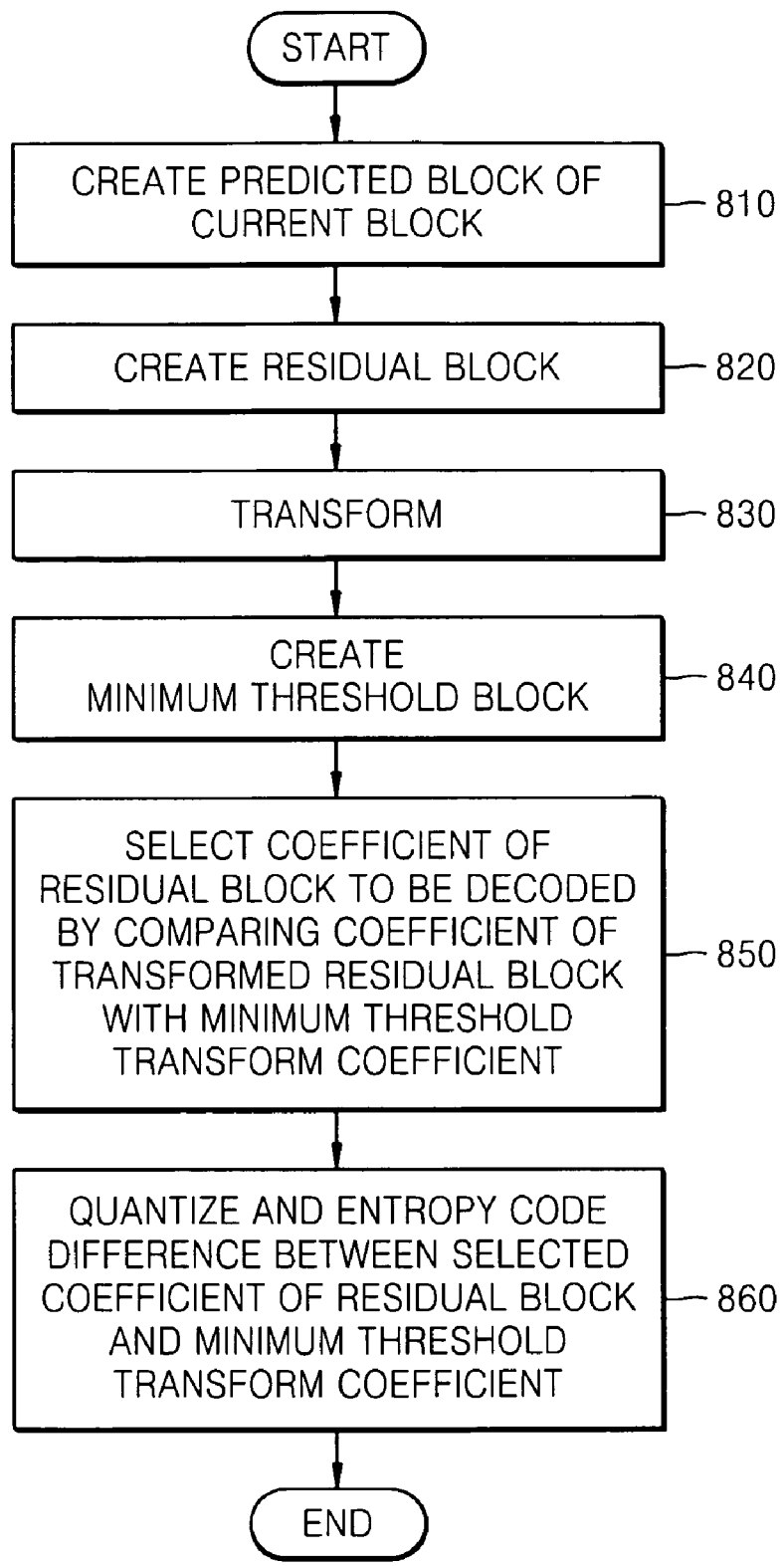
FIG. 8 is a flowchart of an image encoding method according to another exemplary embodiment of the present invention.
Figure 9:
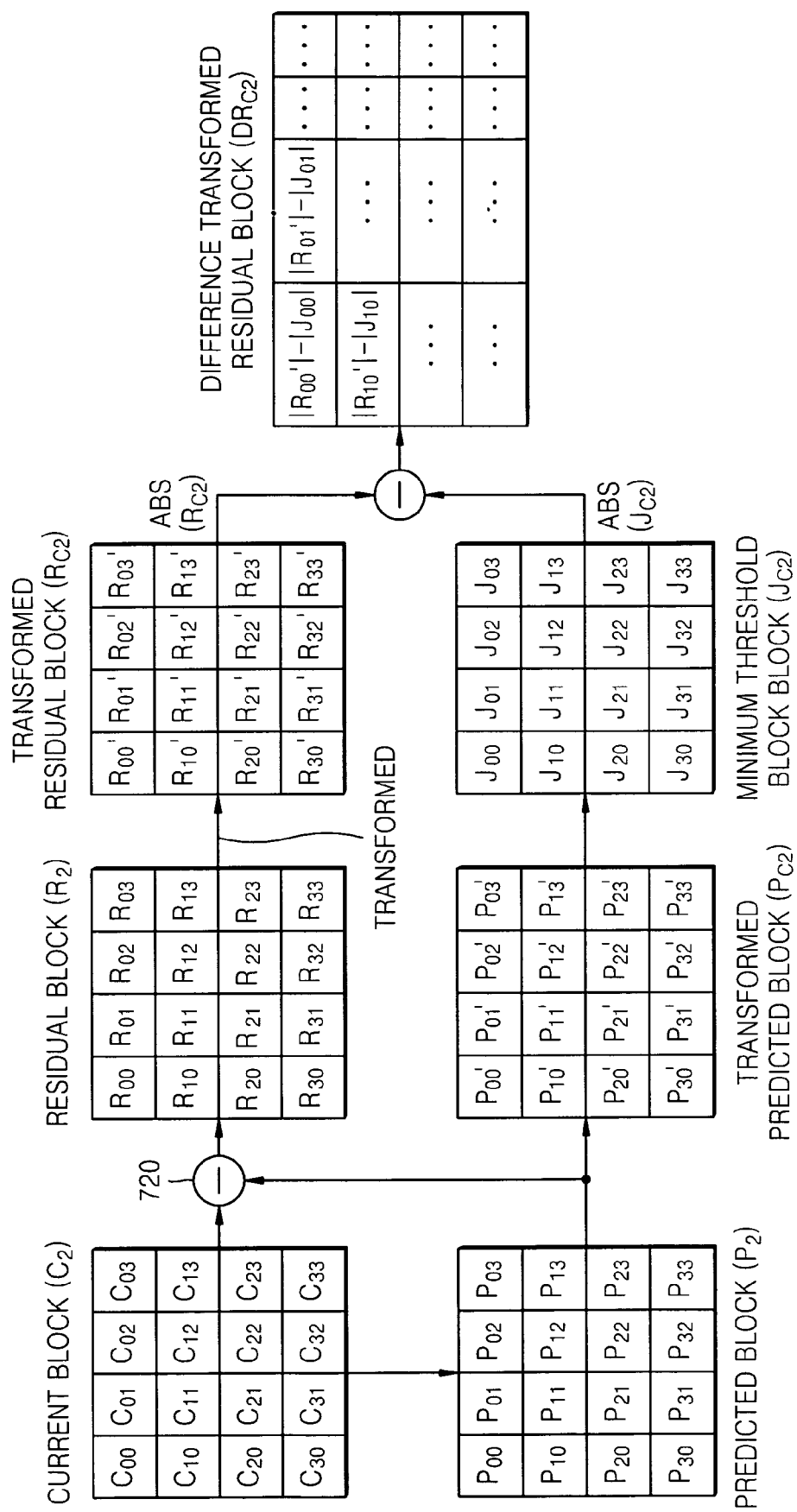
FIG. 9 illustrates blocks respectively created in operations of an image encoding method according to another exemplary embodiment of the present invention.

FIG. 7 is a block diagram of an image encoding apparatus according to another exemplary embodiment of the present invention. FIG. 8 is a flowchart of an image encoding method according to another exemplary embodiment of the present invention. FIG. 9 illustrates blocks respectively created in operations of an image encoding method according to another exemplary embodiment of the present invention. The image encoding method and apparatus of another exemplary embodiment of the present invention will now be described with reference to FIGS. 7 to 9.

In the image encoding method according to another exemplary embodiment of the present invention, minimum threshold transform coefficients which allow each transform coefficient to be visually noticeable are obtained in the transform operation prior to the quantization operation, and only a transformed residual block portion of which coefficient is greater than the minimum threshold transform coefficients is encoded.

Referring to FIG. 7, an image encoding apparatus 700 includes a prediction unit 710, a subtraction unit 720, a first transform unit 730, a second transform unit 740, a minimum threshold block creating unit 750, a selecting unit 760, a quantization unit 770, and an entropy coding unit 780.

In operation 810, the prediction unit 710 performs intra-prediction or inter-prediction with respect to a current block $C_2$ that is input on the basis of a specific sized block to be encoded, thereby creating a predicted block $P_2$ corresponding to the current block $C_2$.

In operation 820, the subtraction unit 720 subtracts the predicted block $P_2$ from the current block $C_2$, thereby creating a residual block $R_2$.

In operation 830, the first transform unit 730 and the second transform unit 740 respectively transform the residual block $R_2$ and the predicted block $P_2$, thereby creating a transformed residual block $R_{c2}$ and a transformed predicted block $P_{c2}$.

In operation 840, the minimum threshold block creating unit 750 obtains minimum threshold transform coefficients J which allow each coefficient included in the transformed predicted block $P_{c2}$ to be visually noticeable, and creates a minimum threshold block $J_{c2}$ including the minimum threshold transform coefficients J.

In operation 850, the selecting unit 760 compares each transformed residual coefficient R' of the transformed predicted block $P_{c2}$ with the minimum threshold transform coefficients J, and determines a coefficient to be encoded among coefficients of the transformed residual block $R_{c2}$.

Specifically, referring to FIG. 9, the selecting unit 760 calculates a difference between an absolute value $\text{ABS}(R_{c2})$ of a transformed residual coefficient of the transformed residual block $R_{c2}$ and an absolute value $\text{ABS}(J_{c2})$ of a coefficient of the minimum threshold block $J_{c2}$, and encodes only a portion where the difference is greater than 0. Since a transform coefficient may be a negative value in the case of DCT or the like, an absolute value is used when the transformed residual coefficient and the minimum threshold transform coefficient are compared with each other. If it is assumed that a transformed residual coefficient located at the position (x, y) of the transformed residual block $R_{c2}$ is $R_{xy}'$, and a coefficient of a corresponding minimum threshold block is $J_{xy}$, then the selecting unit 760 encodes a transformed residual coefficient when $|R_{xy}'|-|J_{xy}|>0$, and defines a corresponding transformed residual coefficient to 0 when $|R_{xy}'|-|J_{xy}|<0$. That is, the selecting unit 760 selects only the transformed residual coefficients $R_{xy}'$ greater than the minimum threshold block $J_{xy}$, and encodes a difference with respect to the minimum threshold transform coefficients. Also, when the difference transformed residual coefficient is a negative value, that is, the minimum threshold transform coefficients are greater than the difference transformed residual coefficient, the difference transformed residual coefficient is set to 0 to reduce the quantity of information to be encoded.

In operation 860, the difference transformed residual coefficient, which is a difference between a coefficient of a transformed residual block selected by the selecting unit 780 and the minimum threshold transform coefficient, is again quantized and encoded through the quantization unit 770 and the entropy coding unit 780, and is output in the form of a bit-stream.

Figure 10:
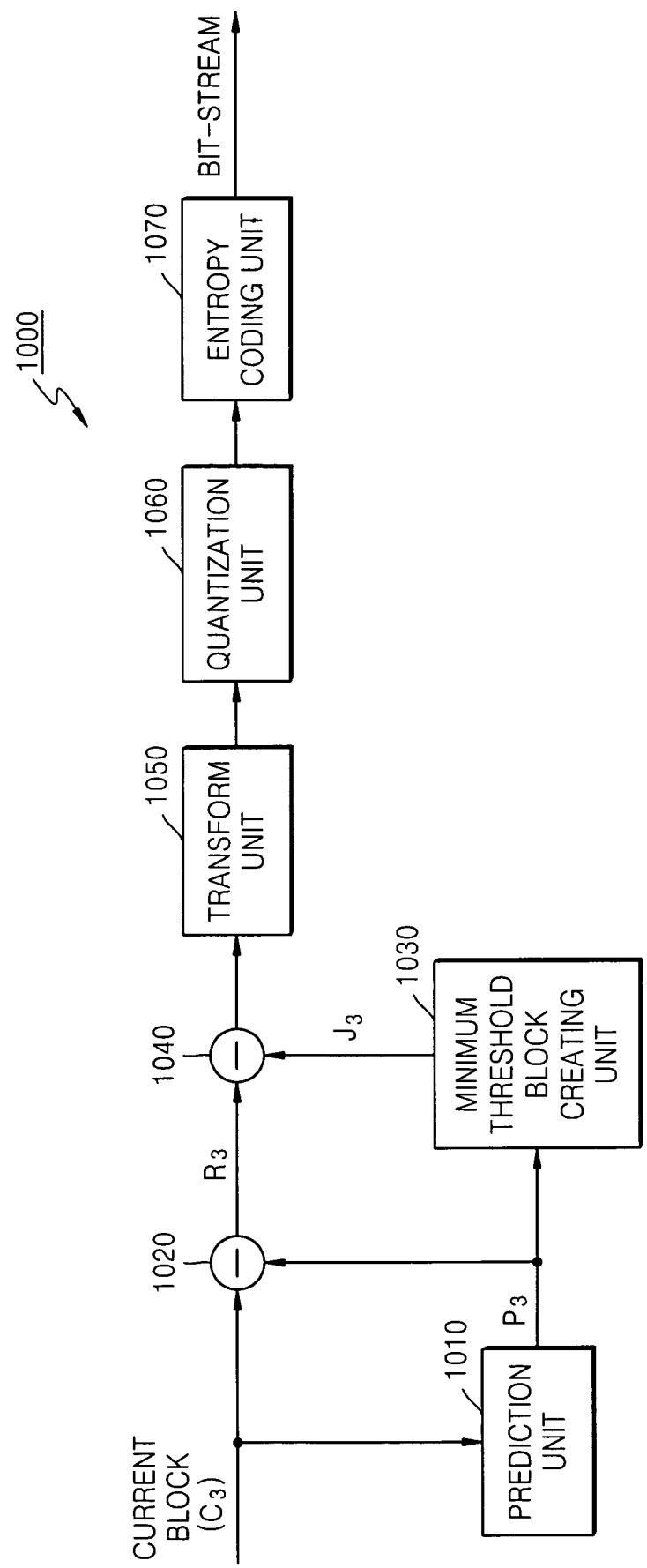
FIG. 10 is a block diagram of an image encoding apparatus according to still another exemplary embodiment of the present invention.
Figure 11:
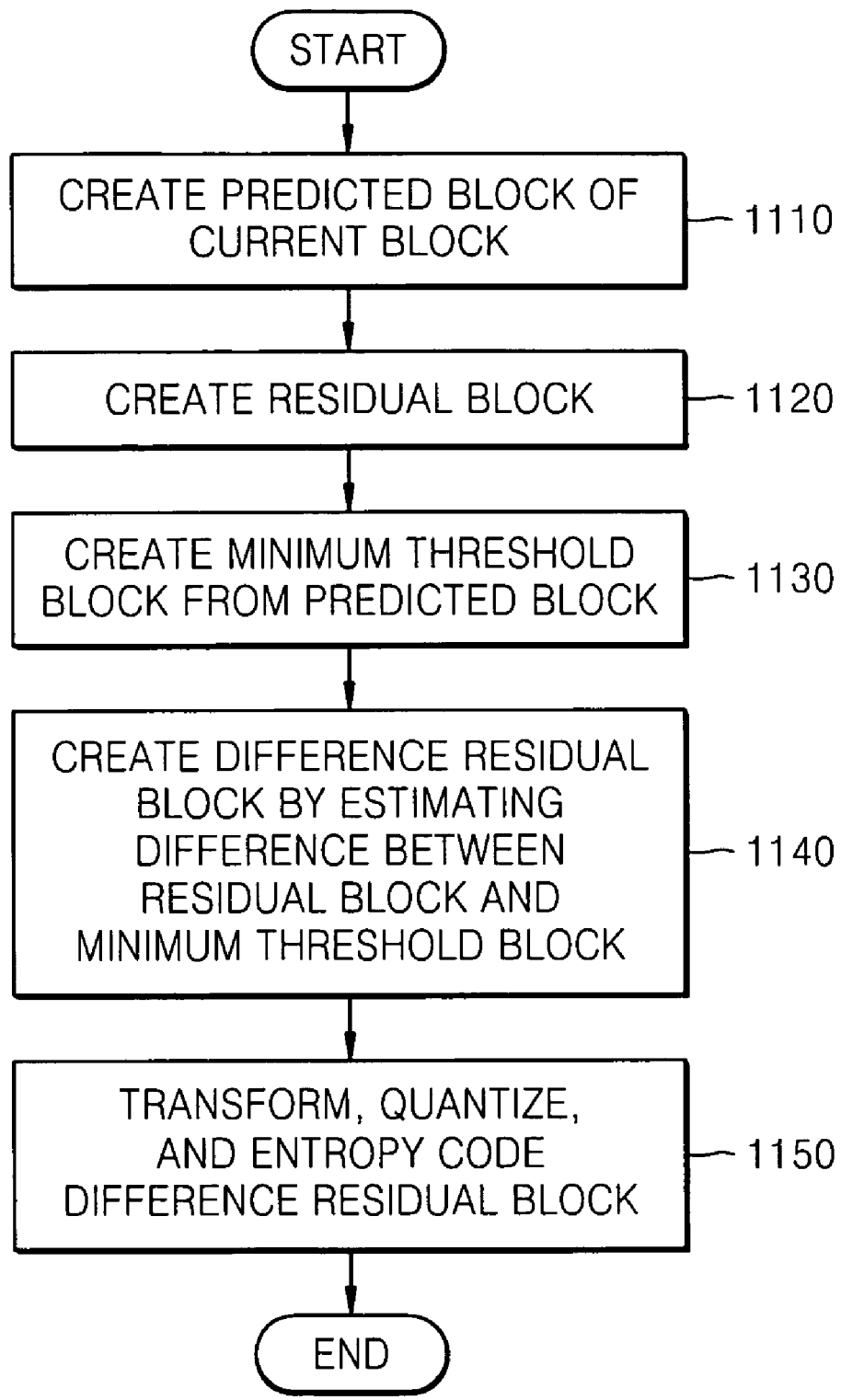
FIG. 11 is a flowchart of an image encoding method according to still another exemplary embodiment of the present invention.
Figure 12:
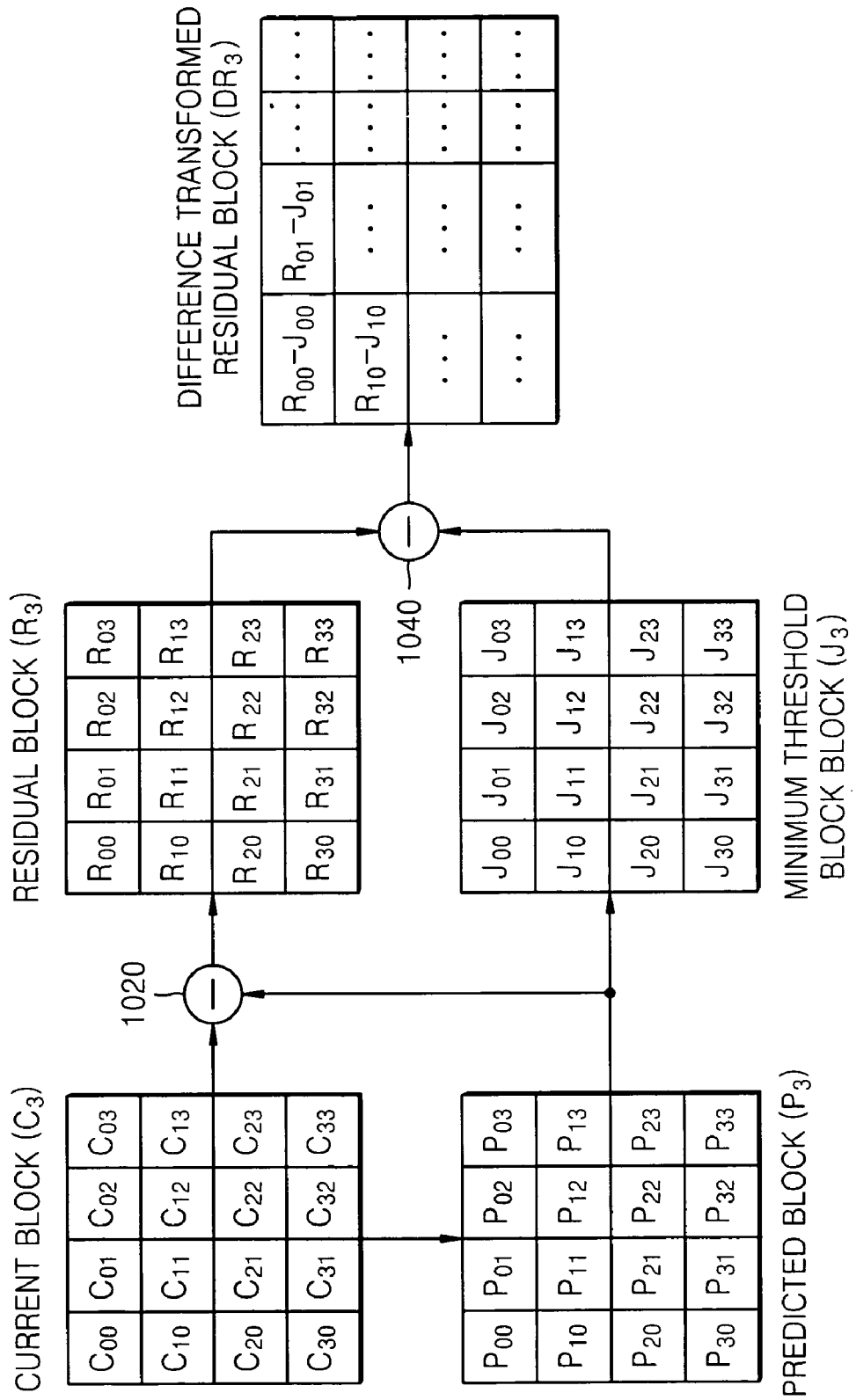
FIG. 12 illustrates blocks respectively created in operations of an image encoding method according to still another exemplary embodiment of the present invention.

FIG. 10 is a block diagram of an image encoding apparatus according to still another exemplary embodiment of the present invention. FIG. 11 is a flowchart of an image encoding method according to still another exemplary embodiment of the present invention. FIG. 12 illustrates blocks respectively created in operations of an image encoding method according to still another exemplary embodiment of the present invention. The image encoding method and apparatus of the present according to still another exemplary embodiment of the present invention will now be described with reference to FIGS. 10 to 12.

In the image encoding method according to still another exemplary embodiment of the present invention, the JND, which allows minimum threshold values of each pixel included in a predicted block to be visually noticeable, is obtained prior to the transform operation, and then a difference between a residual value and the minimum threshold value is encoded.

Referring to FIG. 10, an image encoding apparatus 1000 includes a prediction unit 1010, a first subtraction unit 1020, a minimum threshold block creating unit 1030, a second subtraction unit 1040, a transform unit 1050, a quantization unit 1060, and an entropy coding unit 1070.

In operation 1110, the prediction unit 1010 performs intra-prediction or inter-prediction with respect to a current block $C_3$ that is input on the basis of a specific sized block to be encoded, thereby creating a predicted block $P_3$ corresponding to the current block $C_3$.

In operation 1120, the first subtraction unit 1020 subtracts the predicted block $P_3$ from the current block $C_3$, thereby creating a residual block $R_3$.

In operation 1130, the minimum threshold block creating unit 1030 obtains minimum threshold transform coefficients which allow each pixel included in the predicted block $P_3$ to be visually noticeable, and creates a minimum threshold block $J_3$ including the minimum threshold transform coefficients.

In operation 1140, the second subtraction unit 1040 estimates a difference between the residual block $R_3$ and the minimum threshold block $J_3$, thereby creating a difference residual block $DR_3$. If the difference between the residual block $R_3$ and the minimum threshold block $J_3$ is a negative value, a pixel value of the difference residual block $DR_3$ is set to "0". That is, each pixel of the difference residual block $DR_3$ has a value of max (O, R−J).

In operation 1150, the difference between the residual block $R_3$ and the minimum threshold block $J_3$ used to constitute the difference residual block is encoded and then the transform operation, the quantization operation, and the entropy coding operation are performed.

Figure 13:
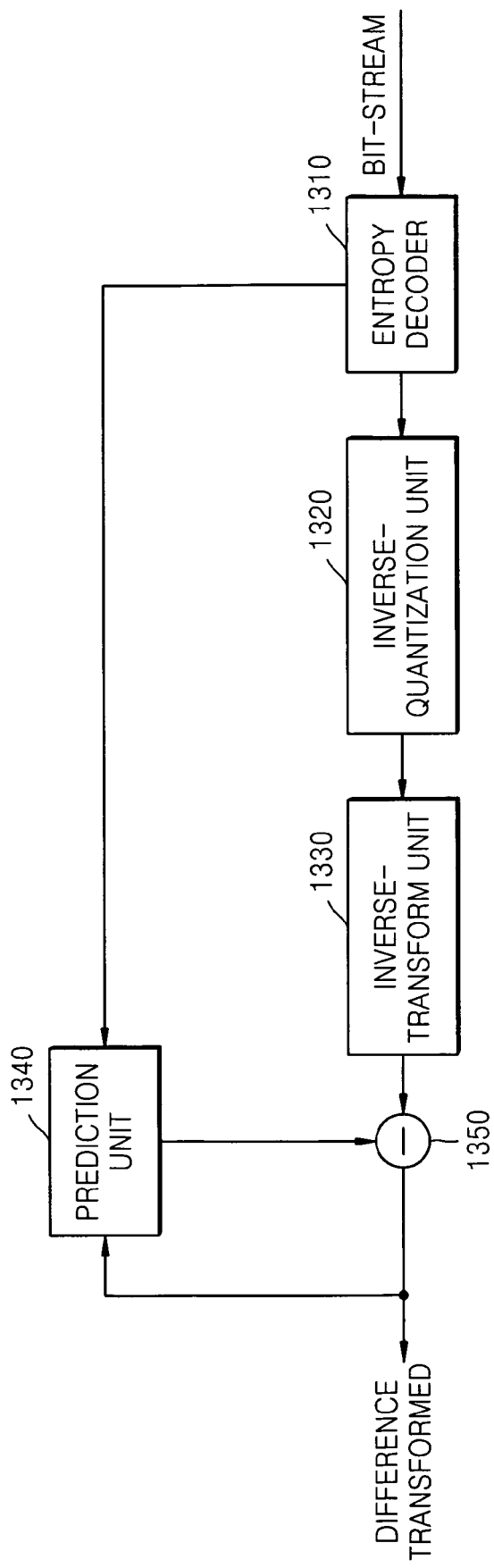
FIG. 13 is a block diagram of an image decoding apparatus according to an exemplary embodiment of the present invention.
Figure 14:
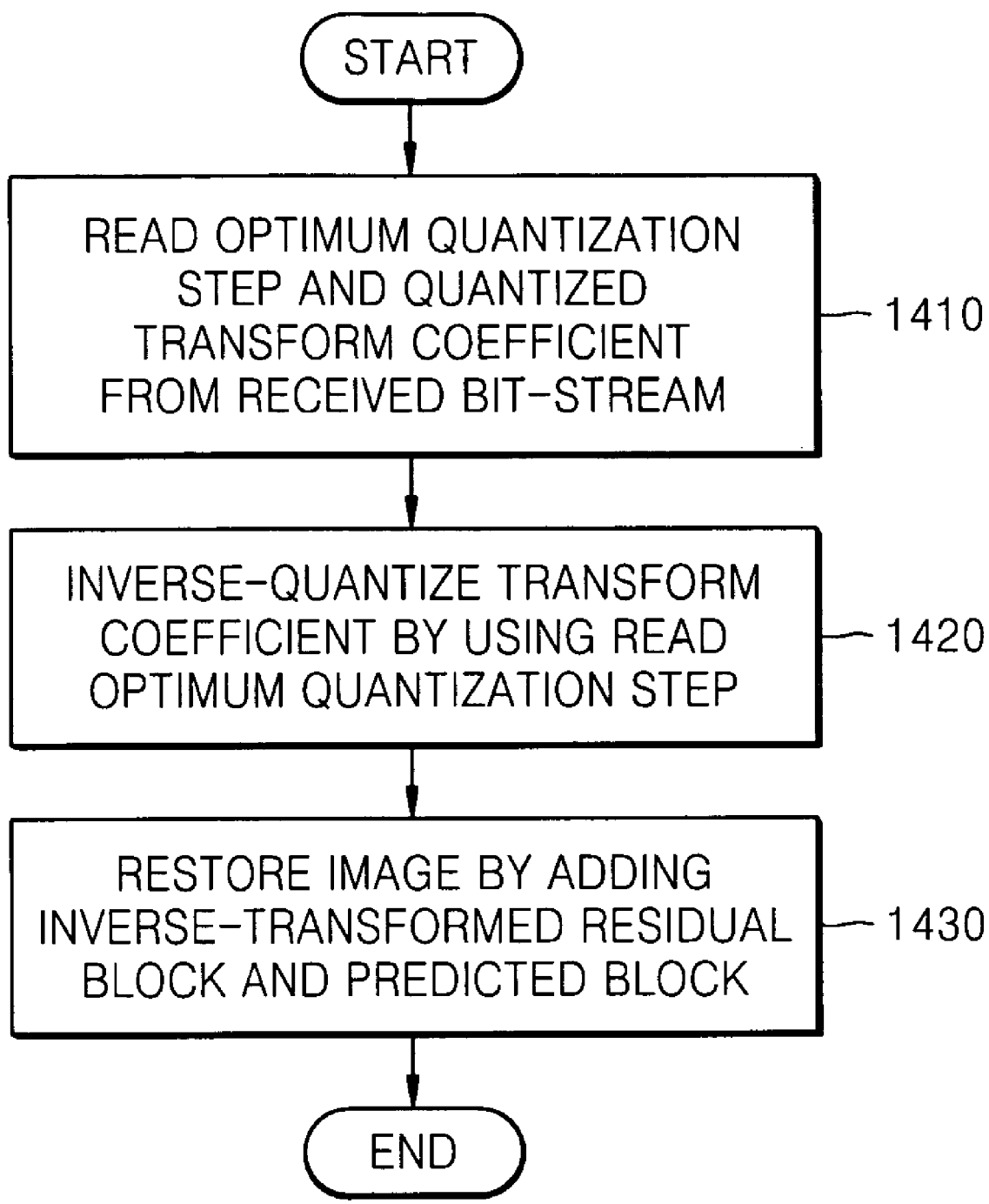
FIG. 14 is a flowchart of an image decoding method according to an exemplary embodiment of the present invention.

FIG. 13 is a block diagram of an image decoding apparatus according to an exemplary embodiment of the present invention. FIG. 14 is a flowchart of an image decoding method according to an exemplary embodiment of the present invention.

Referring to FIG. 13, an image decoding apparatus includes an entropy decoder 1310, an inverse-quantization unit 1320, an inverse-transform unit 1330, a prediction unit 1340, and an add unit 1350.

In operation 1410, the entropy decoder 1310 entropy-decodes a received bit-stream, and reads encoding information such as an optimum quantization step and a quantized transform coefficient which are included in the bit-stream.

In operation 1420, the inverse-quantization unit 1320 inverse-quantizes the read transform coefficient by using the read optimum quantization step, thereby outputting a transform coefficient.

In operation 1430, the prediction unit 1340 performs inter-prediction or intra-prediction with respect to a current block to be decoded according to information on an encoding mode included in the received bit-stream, thereby creating a predicted block. The add unit 1350 adds the predicted block and the residual value that is output from the inverse-transform unit 1330, thereby outputting a restored image.

Accordingly, in the exemplary embodiments of the present invention, a visually noticeable image portion alone is compressed and encoded by using a masking effect of the HVS, thereby improving an image compression rate without visible deterioration of image quality.

Meanwhile, the aforementioned image encoding method of the exemplary embodiments of the present invention can be embodied as computer programs. Codes and code segments for accomplishing the exemplary embodiments of the present invention can be easily construed by programmers skilled in the art. In addition, the computer programs can be stored in a computer readable media, and be read and executed by a specific arithmetic unit, to realize the present invention. Examples of the computer readable media include magnetic tapes, optical data storage devices, and carrier waves.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An image encoding method comprising:
creating a predicted block corresponding to a current block to be encoded using a prediction unit;
creating a residual block by estimating a difference between the current block and the predicted block using a subtraction unit;
creating a transformed residual block and a transformed predicted block by transforming the residual block and the predicted block, respectively using a transform unit;
using a minimum threshold block creating unit for obtaining a minimum threshold transform coefficient which allows a corresponding pixel included in the transformed predicted block to be visually noticeable, and creating a minimum threshold block comprising the minimum threshold transform coefficient; and
using a quantization unit for determining an optimum quantization step which allows a maximum quantization error to be equal to or less than the minimum threshold transform coefficient with respect to a corresponding coefficient of the transformed residual block, and quantizing the corresponding coefficient of the transformed residual block based on the determined optimum quantization step.

2. The method of claim 1, wherein the minimum threshold transform coefficient is a just noticeable distortion estimated from the transformed predicted block.

3. The method of claim 1, wherein, when a quantization step of an i-th coefficient of the transformed residual block is $Q_{step}^{i}$, a maximum quantization error based on the quantization step is $MaxE(Q_{step}^{i})$, and a minimum threshold transform coefficient corresponding to the ith coefficient of the transformed residual block is $J_i$, then an optimum quantization step of the i-th coefficient of the transformed residual block is determined to be a quantization step which has a maximum value among values of the quantization step $Q_{step}^{i}$ satisfying $MaxE(Q_{step}^{i}) \leq J_i$.

4. The method of claim 1, wherein the optimum quantization step is used for a quantization step of the corresponding coefficient of the transformed residual block if a value of the optimum quantization step is greater than a value of a predetermined quantization step for the corresponding coefficient of the transformed residual block.

5. The method of claim 1, further comprising changing an average value of the optimum quantization step while maintaining a relative rate of the determined optimum quantization step for the corresponding coefficient of the transformed residual block.

6. An image encoding method comprising:
creating a predicted block corresponding to a current block to be encoded using a prediction unit;
creating a residual block by estimating a difference between the current block and the predicted block using a subtraction unit;
creating a transformed residual block and a transformed predicted block by transforming the residual block and the predicted block, respectively using a transform unit;
using a minimum threshold block creating unit for obtaining a minimum threshold transform coefficient which allows a corresponding pixel of the transformed predicted block to be visually noticeable, and creating a minimum threshold block comprising the minimum threshold transform coefficient; and
using a selection unit for selecting a coefficient of the transformed residual block to be encoded from coefficients of the transformed residual block by comparing the minimum threshold transform coefficient with a corresponding coefficient of the transformed residual block.

7. The method of claim 6, further comprising quantizing and entropy coding a difference between the selected coefficient of the transformed residual block and the minimum threshold transform coefficient.

8. The method of claim 6, wherein the minimum threshold transform coefficient is a just noticeable distortion estimated from the transformed predicted block.

9. The method of claim 6, wherein an absolute value of the selected coefficient of the transformed residual block is greater than an absolute value of the minimum threshold transform coefficient.

10. An image encoding method comprising:
creating a predicted block corresponding to a current block to be encoded using a prediction unit;
creating a residual block by estimating a difference between the current block and the predicted block using a first subtraction unit;
using a minimum threshold block creating unit for obtaining a minimum threshold coefficient which allows a corresponding pixel included in the predicted block to be visually noticeable, and creating a minimum threshold block comprising the minimum threshold coefficient; and
using a second subtraction unit for creating a difference residual block by estimating a difference between the minimum threshold coefficient and a corresponding coefficient of the residual block.

11. The method of claim 10, wherein the minimum threshold coefficient is a just noticeable distortion estimated from the predicted block.

12. The method of claim 10, further comprising setting a value of a pixel of the difference residual block to "0" if the value is negative.

13. An image encoding apparatus comprising:
a prediction unit which creates a predicted block corresponding to a current block to be encoded;
a subtraction unit which creates a residual block by estimating a difference between the current block and the predicted block;
a first transform unit which creates a transformed residual block by transforming the residual block;
a second transform unit which creates a transformed predicted block by transforming the predicted block;
a minimum threshold block creating unit which obtains a minimum threshold transform coefficient which allows a coefficient included in the transformed predicted block to be visually noticeable, and creates a minimum threshold block comprising the minimum threshold transform coefficient; and
a quantization unit which determines an optimum quantization step which allows a maximum quantization error to be equal to or less than the minimum threshold transform coefficient with respect to a corresponding coefficient of the transformed residual block, and quantizing the corresponding coefficient of the transformed residual block based on the determined optimum quantization step.

14. The apparatus of claim 13, wherein the minimum threshold transform coefficient is a just noticeable distortion estimated from the transformed predicted block.

15. The apparatus of claim 13, wherein, when a quantization step of an i-th coefficient of the transformed residual block is $Q_{step}^i$, a maximum quantization error based on the quantization step is $\text{MaxE}(Q_{step}^i)$, and a minimum threshold transform coefficient corresponding to the i-th coefficient of the transformed residual block is $J_i$, then an optimum quantization step of the i-th coefficient of the transformed residual block is determined to be a quantization step which has a maximum value among values of the quantization step $Q_{step}^i$ satisfying $\text{MaxE}(Q_{step}^i) \leq J_i$.

16. The apparatus of claim 13, wherein the quantization unit determines the optimum quantization step is used for a quantization step of the corresponding coefficient of the transformed residual block only if a value of the optimum quantization step is greater than a predetermined quantization step for the coefficients of the transformed residual block.

17. The apparatus of claim 13, wherein the quantization unit changes an average value of the optimum quantization step while a relative rate of the determined optimum quantization step is maintained for the corresponding coefficient of the transformed residual block.

18. An image encoding apparatus comprising:
a prediction unit which creates a predicted block corresponding to a current block to be encoded;
a subtraction unit which creates a residual block by estimating a difference between the current block and the predicted block;
a first transform unit which creates a transformed residual block by transforming the residual block;
a second transform unit which creates a transformed predicted block by transforming the predicted block;
a minimum threshold block creating unit which obtains a minimum threshold transform coefficient which allows a coefficient included in the transformed predicted block to be visually noticeable, and creates a minimum threshold block comprising the minimum threshold transform coefficient; and
a selecting unit selecting a coefficient of a transformed residual block to be encoded from coefficients of the transformed residual block by comparing the minimum threshold transform coefficient with a corresponding coefficient of the transformed residual block.

19. The apparatus of claim 18, wherein the minimum threshold transform coefficient is a just noticeable distortion estimated from the transformed predicted block.

20. The apparatus of claim 18, wherein the selecting unit selects the coefficient of a transformed residual block to be encoded if an absolute value of the coefficient of the transformed residual block is greater than an absolute value of the minimum threshold transform coefficient.

21. An image encoding apparatus comprising:
a prediction unit which creates a predicted block corresponding to a current block to be encoded;
a first subtraction unit which creates a residual block by estimating a difference between the current block and the predicted block;
a minimum threshold block creating unit which obtains a minimum threshold coefficient which allows a corresponding pixel included in the predicted block to be visually noticeable, and creates a minimum threshold block comprising the minimum threshold coefficient; and
a second subtraction unit which creates a difference residual block by estimating a difference between the minimum threshold coefficient and a corresponding coefficient of the residual block.

22. The apparatus of claim 21, wherein the minimum threshold coefficient is a just noticeable distortion estimated from the predicted block.

23. The apparatus of claim 21, further comprising a quantizing unit which performs quantization by setting a value of a pixel of the difference residual block to "0" if the value is negative.

24. An image decoding method comprising:
using an entropy decoder for reading information on an optimum quantization step, which is determined such that a maximum quantization error is equal to or less than a minimum threshold transform coefficient with respect to each coefficient of a transformed residual block, and information on a coefficient of the transformed residual block, from a received bit-stream, the coefficient being quantized according to the optimum quantization step;
inverse-quantizing the quantized coefficient of the transformed residual block using an inverse quantization unit; and
restoring an image by adding a predicted block for a current block to be decoded and the inverse-transformed transformed residual block using an add unit.

25. The method of claim 24, wherein the minimum threshold transform coefficient is a just noticeable distortion estimated from a transformed predicted block.

26. An image decoding apparatus comprising:
an entropy decoder which reads information on an optimum quantization step, which is determined such that a maximum quantization error is equal to or less than a minimum threshold transform coefficient with respect to each coefficient of a transformed residual block, and information on a coefficient of the transformed residual block, from a received bit-stream, the coefficient being quantized according to the optimum quantization step;
an inverse-quantization unit inverse-quantizing the coefficients of the transformed residual block, which are quantized according to the read optimum quantization step;
an inverse-transform unit which outputs a residual block by inverse-transforming the quantized coefficient of the transformed residual block;
a prediction unit which creates a predicted block for a current block to be decoded; and
an add unit which restores an image by adding the inverse-transformed residual block and the predicted block.

27. The apparatus of claim 26, wherein the minimum threshold transform coefficient is a just noticeable distortion estimated from a transformed predicted block.

28. An image encoding method comprising:
creating a predicted image corresponding to a current image to be encoded using a prediction unit;
creating a residual image by estimating a difference between the current image and the predicted image using a subtraction unit;
creating a transformed residual image and a transformed predicted image by transforming the residual image and the predicted image, respectively using a transform unit;
using a minimum threshold block creating unit for obtaining a minimum threshold transform coefficient which allows a corresponding pixel included in the transformed predicted image to be visually noticeable, and creating a minimum threshold image comprising the minimum threshold transform coefficient; and
using a quantization unit for determining an optimum quantization step which allows a maximum quantization error to be equal to or less than the minimum threshold transform coefficient with respect to a corresponding coefficient of the transformed residual image, and quantizing the corresponding coefficient of the transformed residual image based on the determined optimum quantization step.

29. An image encoding method comprising:
creating a predicted image corresponding to a current image to be encoded;
creating a residual image by estimating a difference between the current image and the predicted image;
creating a transformed residual image and a transformed predicted image by transforming the residual image and the predicted image, respectively;
obtaining a minimum threshold transform coefficient which allows a corresponding pixel of the transformed predicted image to be visually noticeable, and creating a minimum threshold image comprising the minimum threshold transform coefficient; and
selecting a coefficient of the transformed residual image to be encoded from coefficients of the transformed residual image by comparing the minimum threshold transform coefficient with a corresponding coefficient of the transformed residual image.

30. An image encoding method comprising:
creating a predicted image corresponding to a current image to be encoded using a prediction unit;
creating a residual image by estimating a difference between the current image and the predicted image using a first subtraction unit;
using a minimum threshold block creating unit for obtaining a minimum threshold coefficient which allows a corresponding pixel included in the predicted image to be visually noticeable, and creating a minimum threshold image comprising the minimum threshold coefficient; and
using a second subtraction unit for creating a difference residual image by estimating a difference between the minimum threshold coefficient and a corresponding coefficient of the residual image.

31. An image encoding apparatus comprising:
a prediction unit which creates a predicted image corresponding to a current image to be encoded;
a subtraction unit which creates a residual image by estimating a difference between the current image and the predicted image;
a first transform unit which creates a transformed residual image by transforming the residual image;
a second transform unit which creates a transformed predicted image by transforming the predicted image;
a minimum threshold image creating unit which obtains a minimum threshold transform coefficient which allows a coefficient included in the transformed predicted image to be visually noticeable, and creates a minimum threshold image comprising the minimum threshold transform coefficient; and a quantization unit which determines an optimum quantization step which allows a maximum quantization error to be equal to or less than the minimum threshold transform coefficient with respect to a corresponding coefficient of the transformed residual image, and quantizing the corresponding coefficient of the transformed residual image based on the determined optimum quantization step.

32. An image encoding apparatus comprising:

a prediction unit which creates a predicted image corresponding to a current image to be encoded;

a subtraction unit which creates a residual image by estimating a difference between the current image and the predicted image;

a first transform unit which creates a transformed residual image by transforming the residual image;

a second transform unit which creates a transformed predicted image by transforming the predicted image;

a minimum threshold image creating unit which obtains a minimum threshold transform coefficient which allows a coefficient included in the transformed predicted image to be visually noticeable, and creates a minimum threshold image comprising the minimum threshold transform coefficient; and a selecting unit selecting a coefficient of a transformed residual image to be encoded from coefficients of the transformed residual image by comparing the minimum threshold transform coefficient with a corresponding coefficient of the transformed residual image.

33. An image encoding apparatus comprising:

a prediction unit which creates a predicted image corresponding to a current image to be encoded;

a first subtraction unit which creates a residual image by estimating a difference between the current image and the predicted image;

a minimum threshold image creating unit which obtains a minimum threshold coefficient which allows a corresponding pixel included in the predicted image to be visually noticeable, and creates a minimum threshold image comprising the minimum threshold coefficient; and a second subtraction unit which creates a difference residual image by estimating a difference between the minimum threshold coefficient and a corresponding coefficient of the residual image.

34. An image decoding method comprising:

using an entropy decoder for reading information on an optimum quantization step, which is determined such that a maximum quantization error is equal to or less than a minimum threshold transform coefficient with respect to each coefficient of a transformed residual image, and information on a coefficient of the transformed residual image, from a received bit-stream, the coefficient being quantized according to the optimum quantization step;

inverse-quantizing the quantized coefficient of the transformed residual image using an inverse quantization unit; and restoring an image by adding a predicted image for a current image to be decoded and the inverse-transformed transformed residual image using an add unit.

35. An image decoding apparatus comprising:

an entropy decoder which reads information on an optimum quantization step, which is determined such that a maximum quantization error is equal to or less than a minimum threshold transform coefficient with respect to each coefficient of a transformed residual image, and information on a coefficient of the transformed residual image, from a received bit-stream, the coefficient being quantized according to the optimum quantization step;

an inverse-quantization unit inverse-quantizing the coefficients of the transformed residual image, which are quantized according to the read optimum quantization step;

an inverse-transform unit which outputs a residual image by inverse-transforming the quantized coefficient of the transformed residual image;

a prediction unit which creates a predicted image for a current image to be decoded; and an add unit which restores an image by adding the inverse-transformed residual image and the predicted image.

* * * * *